United States Patent [19]
Kuo et al.

[11] Patent Number: 6,047,001
[45] Date of Patent: Apr. 4, 2000

[54] APPARATUS AND METHOD IN A NETWORK INTERFACE DEVICE FOR STORING A DATA FRAME AND CORRESPONDING TRACKING INFORMATION IN A BUFFER MEMORY

[75] Inventors: Jerry Chun-Jen Kuo; Po-Shen Lai, both of San Jose; Autumn Jane Niu, Sunnyvale, all of Calif.

[73] Assignee: Advanced Micro Devices, Inc., Sunnyvale, Calif.

[21] Appl. No.: 08/993,056

[22] Filed: Dec. 18, 1997

[51] Int. Cl.[7] ............................. H04L 12/28; H04L 12/56; H04L 12/54
[52] U.S. Cl. ............................. 370/428; 370/392; 710/53
[58] Field of Search ..................... 370/407, 408, 370/428, 445, 446, 463, 412, 389, 392; 711/104, 117; 710/52–54, 56

[56] References Cited

U.S. PATENT DOCUMENTS

| 5,951,635 | 9/1999 | Kamgar | 709/201 |
| 5,974,518 | 10/1999 | Nogradi | 711/173 |
| 5,987,506 | 11/1999 | Carter et al. | 709/213 |

Primary Examiner—Douglas W. Olms
Assistant Examiner—David R Vincent

[57] ABSTRACT

A network interface device having a random access memory for buffering data between a host bus interface and a media access controller includes a buffer controller configured for storing a data frame in combination with tracking and status information associated with the storage of the data frame. The memory controller is configured for writing transmit frame data received from a host bus into the random access memory, and generating tracking information based on transfer status signals corresponding to the transfer of the data frame from either a master transfer mode or a slave transfer mode. Hence, the amount of logic associated with generating the tracking, control and/or status information is independent of the nature of the transfer from the host bus. The tracking and status information is stored in memory locations contiguous with the data frame to enable a read controller to access the status information and the corresponding data frame as a single data unit. A second write controller for data received from the media access controller stores the received data frame and the corresponding status information from the media access controller in contiguous memory locations in a receive buffer to form a single data unit.

19 Claims, 9 Drawing Sheets

APPARATUS AND METHOD IN A NETWORK INTERFACE DEVICE FOR STORING A DATA FRAME AND CORRESPONDING TRACKING INFORMATION IN A BUFFER MEMORY

BACKGROUND OF THE INVENTION

1. Technical Field

The present invention relates to network interfacing and more particularly, to methods and systems for buffering data between a host bus interface and a media access controller accessing Ethernet media.

2. Background Art

Network interface devices handle packets of data for transmission between a host computer and a network communications system, such as a local area network. The host computer may be implemented as a client station, a server, or a switched hub. One primary function of the network interface device is to buffer data to compensate for timing discrepancies between the clock domain of the host computer and the clock domain of the network.

Network interface devices typically include a first in, first out (FIFO) buffer memory for storing transmit and receive data, where the transmit data is stored in a transmit FIFO prior to transmission on the network media by a media access controller (MAC), and receive data is stored in a receive FIFO by the MAC prior to transfer to the host computer via the host computer bus interface.

One disadvantage with the use of a FIFO for a transmit buffer or a receive buffer is the increased latency encountered during the buffering process. The latency of the network interface device is the time delay between the time that a data frame is supplied to the network interface device and the time the data is transmitted on the network media, or vice versa. data frame is supplied to the network interface device and the time the data is transmitted on the network media, or vice versa.

An additional disadvantage with the use of a FIFO for transmit buffer or receive buffer is the increasing complexity associated with maintaining status information for each data frame stored in the FIFO buffer. If a stored data frame is to have corresponding status information, then an additional FIFO buffer would be required for storing the status information for each stored data frame. Hence, a transmit buffer may require a frame data FIFO for the actual frame data, and a status FIFO for storing the corresponding status information for each data frame. Such an arrangement would result in a substantial increase in the amount of area required on a chip for the status FIFO. In addition, additional synchronization logic would be required to maintain correspondence between the stored frame data and the corresponding status data, increasing the cost and complexity of the network interface device.

DISCLOSURE OF THE INVENTION

There is a need for an arrangement that enables use of a random access memory in a network controller, as opposed to a FIFO buffer, to store both a data frame and corresponding tracking information indicating the status of the stored data frame.

There is also a need for an arrangement that enables storage of frame data and tracking information in contiguous memory locations, to enable access of the frame data and the corresponding tracking information in an efficient manner.

There is also a need for an arrangement in a network interface device for storing transmit frame data and corresponding tracking information in a random access memory, where the tracking information is generated using a single logic independent of the nature of the access between the network interface device and a host bus supplying the transmit frame data.

There is also a need for an arrangement in a network interface device for storing frame data in a random access memory, where a memory controller generates tracking information, regardless of whether the frame data is received by the network interface device according to master transfer mode or slave transfer mode, for storage in a memory location contiguous with the stored frame.

These and other needs are attained by the present invention, where a memory controller is configured for generating tracking information based on transfer status signals corresponding to the reception of the data frame, which may be supplied by either a master interface or a slave interface in the network interface device. The memory controller generates the tracking information for the data frame following writing of the data frame in the random access memory, and writes the tracking information in a reserved memory location contiguous with the data frame.

According to one aspect of the present invention, a method in a network interface device stores data associated with a data frame in a buffer memory. The method includes the steps of reserving a first buffer memory location of the buffer memory for tracking information corresponding to the data frame, writing the data frame in contiguous buffer memory locations following the first buffer memory location, and generating the tracking information for the data frame following the data frame writing step, and writing the generated tracking information into the first buffer memory location. Reserving the first buffer memory location enables a network interface device to write the data frame in the contiguous buffer memory locations, and then update the first buffer memory location with the generated tracking information. Hence, the tracking information and the corresponding data frame may be stored in contiguous memory locations, enabling the tracking information and the corresponding data frame to be accessed as a single data unit. Hence, a read controller accessing the SRAM can obtain frame data and the corresponding tracking information during a single read operation. Moreover, placement of the tracking information in a buffer memory location preceding the data frame enables a write controller to determine whether the corresponding data frame stores invalid data, requiring the read operation to be aborted or "flushed out". Hence, data frames may be stored in a buffer memory in an efficient manner, where the corresponding tracking information is stored contiguous with the data frame to enable efficient management of the stored data frames.

Another aspect of the present invention provides a network interface device for storing a data frame. The network interface device includes a bus interface unit configured for receiving a data frame from a host bus, the bus interface unit including a master interface for controlling reception of the data frame according to a master access protocol and a slave interface for receiving the data frame according to a slave access protocol, a random access memory for storing the received data frame, and a memory controller. The memory controller is configured for writing the received data frame and corresponding tracking information into the random access memory, the memory controller generating the tracking information based on transfer status signals corresponding to the reception of the data frame from one of the master interface and the slave interface. Generation of the tracking information in the memory controller based on the transfer status signals enables the memory controller to act a generic interface for generating tracking information, independent of whether the data frame is transferred according to a master access protocol or a slave access protocol, minimizing the required logic for generating tracking information. Moreover, the memory controller enables the received data frame and the corresponding tracking information to be stored into the random access memory at contiguous locations, enabling a read controller to quickly determine the status of a stored data frame by accessing the corresponding tracking information.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention will be described with the example of a network interface device in a packet switched network, such as an Ethernet (IEEE 802.3) network. A description will first be given of a network interface device architecture, followed by the arrangement for storing the data frame and corresponding tracking information in a buffer memory, independent of the use of either a master transfer or a slave transfer from the host bus. It will become apparent, however, that the present invention is also applicable to other network interface device systems.

Network Interface Device Architecture

Figures 1, 1A:
FIGS. 1A and 1B are block diagrams illustrating an exemplary network interface device having a memory controller for writing a data frame and corresponding tracking information into a random access memory according to an embodiment of the present invention.
Figure 1B:
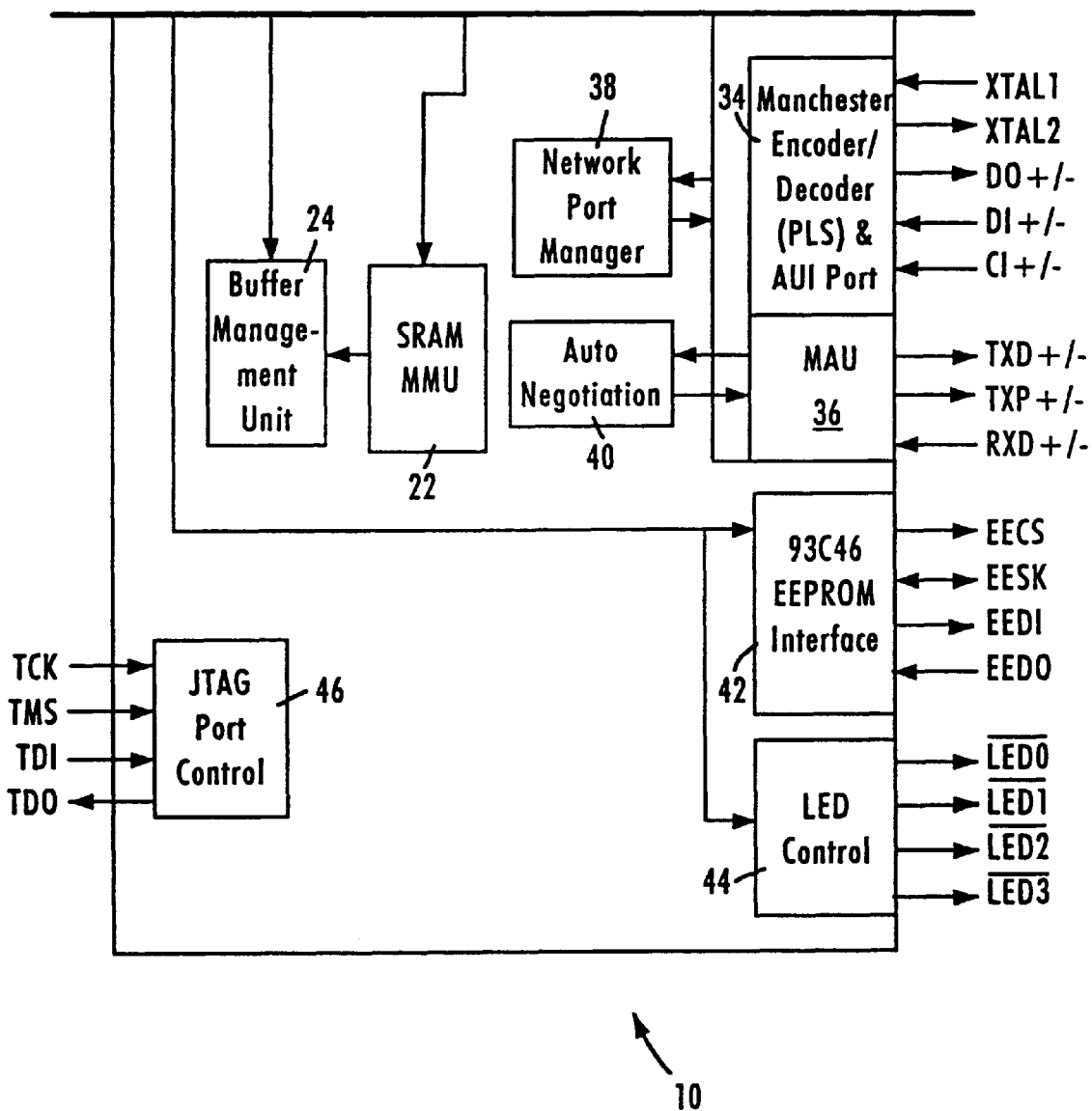

FIG. 1 is a block diagram of an exemplary network interface device 10 that accesses the media of an Ethernet (ANSI/IEEE 802.3) network according to an embodiment of the present invention.

The network interface device 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface device portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface device 10 to and from system memory. Hence, the PCI bus interface unit 16 can be selectively configured for PCI transfers in slave and/or master (e.g., DMA) mode.

The memory portion 18 includes a 32-bit SRAM implemented directly on the network interface device chip 10. According to the disclosed embodiment, the SRAM 18 may be accessed in a random access manner under the control of a memory management unit 22, or may be segmented into a receive portion 18a and a transmit portion 18b for receive and transmit paths, respectively.

The network interface device 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory management unit 22 are shown as discrete components, the two units may be integrated to form a memory management unit controlling all transfers of data to and from the memory unit 18.

The network interface device 20 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface device 10 also includes a network port manager 38 configured for performing MII handshaking between two devices on an MII bus via the MII port 30. Such MIT handshaking may include link information, programming information at the MI layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface device status registers (not shown). The network interface device 10 also includes an IEEE 1149.1-compliant JTAG boundary scan test access port interface 36.

The EEPROM interface 42 connects to an EEPROM on either a network interface device adapter card or the motherboard of the host computer via a serial interface link. The EEPROM (not shown in FIG. 1)) will be programmed with configuration information related to the network interface device, enabling the network interface device to be configured during initialization via the EEPROM interface 42. Once initialized, the network interface device stores the configuration information in internal registers (not shown), enabling the network interface device to operate independently of the host computer in the event the host computer is powered down. Hence, the network interface device can be configured to operate while the host computer is in a stand-by mode, enabling the network interface device to output power up information to logic within the host computer to enable the host computer to automatically turn on in response to data packets received from the network and having a specific protocol, described below.

Memory Management Architecture

Figure 2:
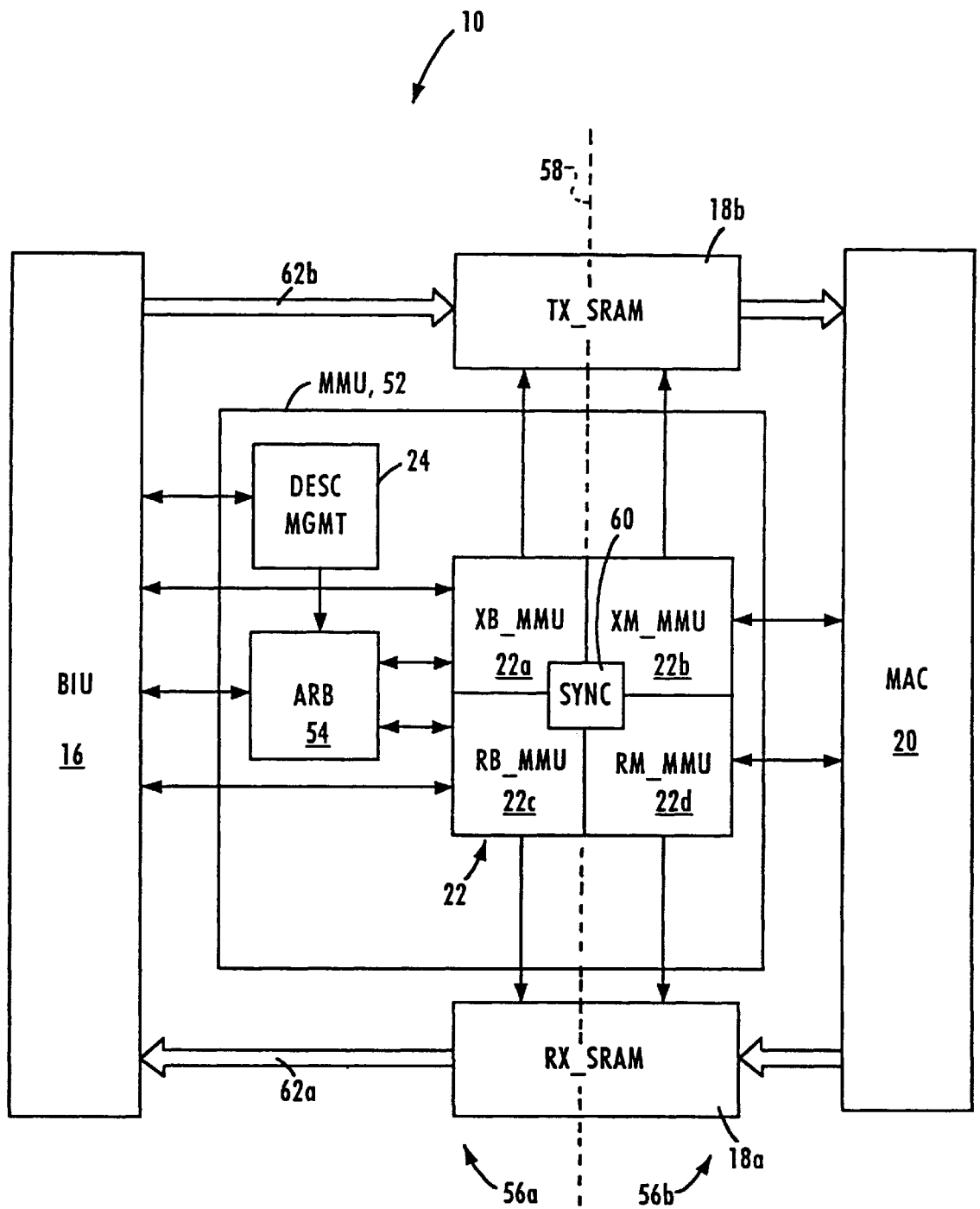
FIG. 2 is a block diagram illustrating in detail the buffer architecture of the network interface device of FIG. 1 according to an embodiment of the present invention.

FIG. 2 is a block diagram illustrating the buffer architecture of the network interface device 10 according to an embodiment of the present invention. As shown in FIG. 2, transfer of data frames between the PCI bus interface unit 16, also referred to as the bus interface unit (BIU), and the MAC 20 is controlled by a memory management unit (MMU) 52 including the buffer management unit 24 and the SRAM MMU 22 of FIG. 1. The MMU 52 controls the reading and writing of data to the SRAM 18, illustrated in FIG. 2 as a receive SRAM portion 18a and a transmit SRAM portion 18b for convenience. It will be recognized in the art that the receive SRAM (RX_SRAM) 18a and the transmit SRAM (TX_SRAM) 18b may be implemented as a single memory device, or alternatively as two separate SPAM devices.

As shown in FIG. 2, the memory management unit includes the buffer management unit 24, also referred to as the descriptor management unit, the SRAM MMU 22, and an arbitration unit 54. The arbitration unit 54 arbitrates DMA requests for data transmission, data reception, descriptor lists from the descriptor management block 24, and status.

The SPAM MMU 22 includes separate controllers for each SRAM 18a and 18b, for both read and write operations. According to the disclosed embodiment, the network interface device 10 operates in two generic clock domains, namely a host computer bus clock domain 56a, and a network clock domain 56b. Since the network interface device 10 needs to send and receive data across two independent clock domains 56, divided by the dotted line 58, the SRAM MMU 22 needs to be able to write and read data to each SRAM 18a and 18b in a manner that tracks memory status independent of the PCI clock in the host computer domain and the MAC clock generated from network activity in the network domain 56b.

According to the disclosed embodiment, the SRAM MMU includes a transmit-data bus-side memory management unit (XB_MMU) 22a, a transmit data MAC-side memory management unit (XM_MMU) 22b, a receive-data busside memory management unit (RB_MMU) 22c. a receive-data MAC-side memory management unit (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI bus clock (CLK). The RM_MMU 22d operates according to the receive MAC clock (RX_CLK) received by the MAC 20, and the XM_MMU 22b operates under the control of the MAC transmit clock (TX_CLK) received by the MAC 20. The XM_MMU 22b and the RB_MMU 22c operate as read controllers configured for reading frame data from the SRAMs 18b and 18a, respectively. Hence, receive data from the MAC 20 is written into the RX_SRAM 18a under the control of the write controller 22d synchronous to the receive clock (RX_CLK) in the network clock domain 56b. Frame data stored in the RX_SRAM 18a is read and output to the BIU 16 via data path 62a under the control of the receive-data read controller 22c, which reads the frame synchronous to the PCI bus clock signal.

Similarly, transmit data to be output onto the network by the MAC 20 is written into the TX_SRAM 18b via data path 62b under the control of the transmit-data write controller 22a, configured for writing the frame data synchronized to the PCI bus clock (CLK). The stored transmit data is read and output from the TX_SRAM 18b to the MAC 20 under the control of the transmit-data read controller 22b according to the MAC transmit clock (TX_CLK) within the network clock domain 56b.

The presence of two separate clock domains 56a and 56b in writing and reading to a random access memory 18 requires that the write controller and read controller devices be coordinated and synchronized to ensure that no contention issues arise due to the relative independence of the two clock domains 56a and 56b. The SRAM MMU 22 includes a synchronization circuit 60 that asynchronously monitors the status of the RX_SRAM 18a and 18b, enabling the memory controllers to read and write to the memory 18 between the two clock domains 56a and 56b. Thus, problems that would ordinarily arise between the two clock domains in the individual memory management units 22a, 22b, 22c and 22d are avoided by use of the synchronization circuit 60 according to a prescribed arbitration logic.

Figure 3A:
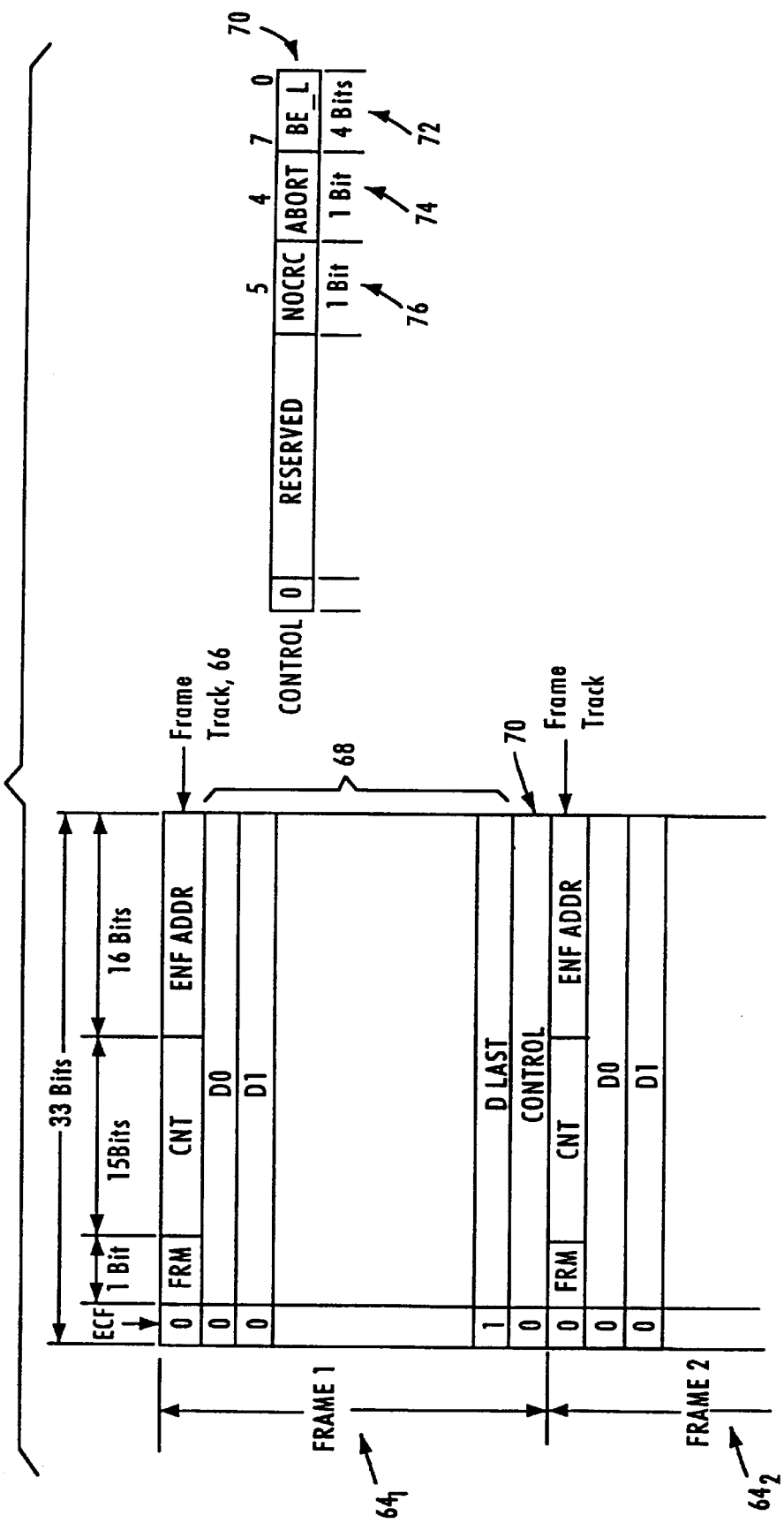
FIGS. 3A and 3B are diagrams illustrating an exemplary data structure of a transmit data frame and a received data frame stored in the random access memory of FIG. 1 respectively.
Figure 3B:
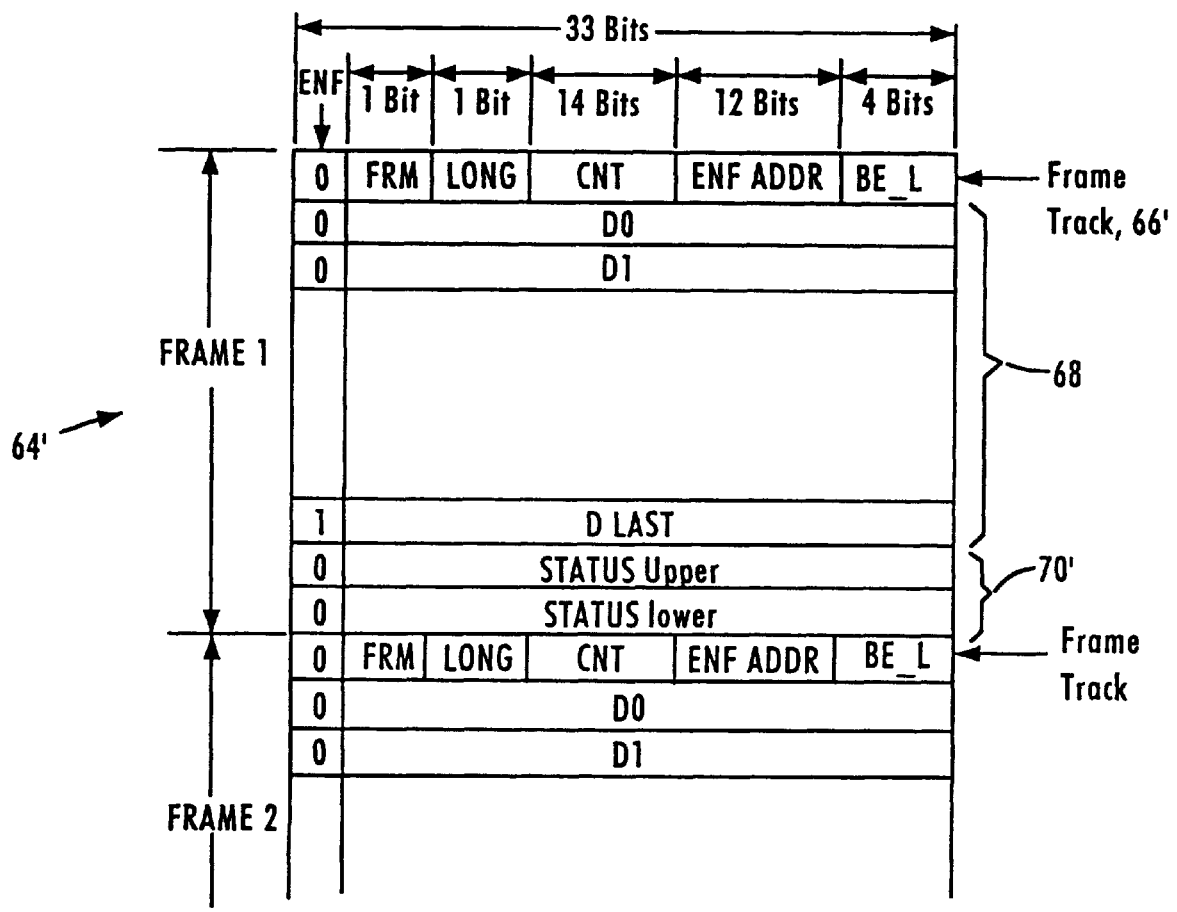

FIG. 3A is a diagram illustrating the data structure of a transmit data unit 64 in the TX_SRAM 18b, and FIG. 3B is a diagram illustrating the data 25 structure of a receive data unit 64' in the RX_SRAM 18a. As shown in FIGS. 3A and 3B, each stored data unit 64 (and 64') includes a corresponding frame track field 66 (and 66') preceding a group of data bytes of a stored data frame 68 in contiguous buffer memory locations. Specifically, the stored data frame 68 is stored in 32-bit memory locations in a contiguous sequence. The data unit 64 also includes a 32-bit control word 70 storing status information in a memory location contiguous with and following the stored frame data 68. As shown in FIG. 3A, the transmit SRAM stores a single 32-bit control word 70 for storing the status information, whereas the receive data unit 64' includes status information stored in two contiguous 32-bit words contiguous with and following the frame data 68.

Hence, the memory controller (XB_MMU) 22a stores in the TX_SRAM 18b frame track information 66, and status information related to the transmit data frame 68 in a control field 70. The frame track field 66 is used by the XM_MMU 22b to keep track of the location of the corresponding data frame 68 and the TX_SRAM 18*b*. Hence, the frame track 66 enables the XM_MMU 22*b* to quickly flush a stored data unit 63 having transmit frame data 68 and jump to the beginning of the next stored data unit (e.g., 64$_2$), based on an end of frame address field (ENF ADDR), a count (CNT) field specifying the number of DWORDS (D0, D1, . . . , DLAST), and information in the control field 70. As shown in FIG. 3A, the control field 70 includes a byte enable (active low) field (BE_L) that specifies the valid bytes in the last contiguous memory location storing the data frame 68 (DLAST). The control field 70 also includes a one-bit abort field 74 specifying whether the corresponding stored data frame 68 was stored after an aborted transfer, and whether transmission of the stored frame should be aborted. The control field 70 also includes a NOCRC field 76, indicating that the stored data frame 68 already has an appended cyclic redundancy check (CRC) field appended, such that CRC generation is not necessary by the MAC 20.

Hence, the frame track field 66 and the status information in the control field 70 enable the read controller (XM_MMU) 22*b* to quickly abort a stored frame 68 and jump to the beginning of the next frame. In addition, storage of the frame track field 60 and control field 70 in a data unit 64 enables the write controller (XB_MMU) 22*a* and the read controller (XM_MMU) 22*b* to operate independently in the two separate clock domains 56, since all necessary status and control information are stored in locations contiguous to the stored data frame 68. Moreover, the write controller (e.g., XB_MMU 22*a* or RM_MMU 22*d* for receive side) concurrently outputs the generated frame track field 66 to the corresponding buffer memory 18 and the synchronization circuit 60. Hence, the writing of the frame track to the synchronization circuit 60 enables the appropriate read controller to quickly determine the status of stored frame data units 64 in the respective transmit and receive buffer memories.

Figure 4:
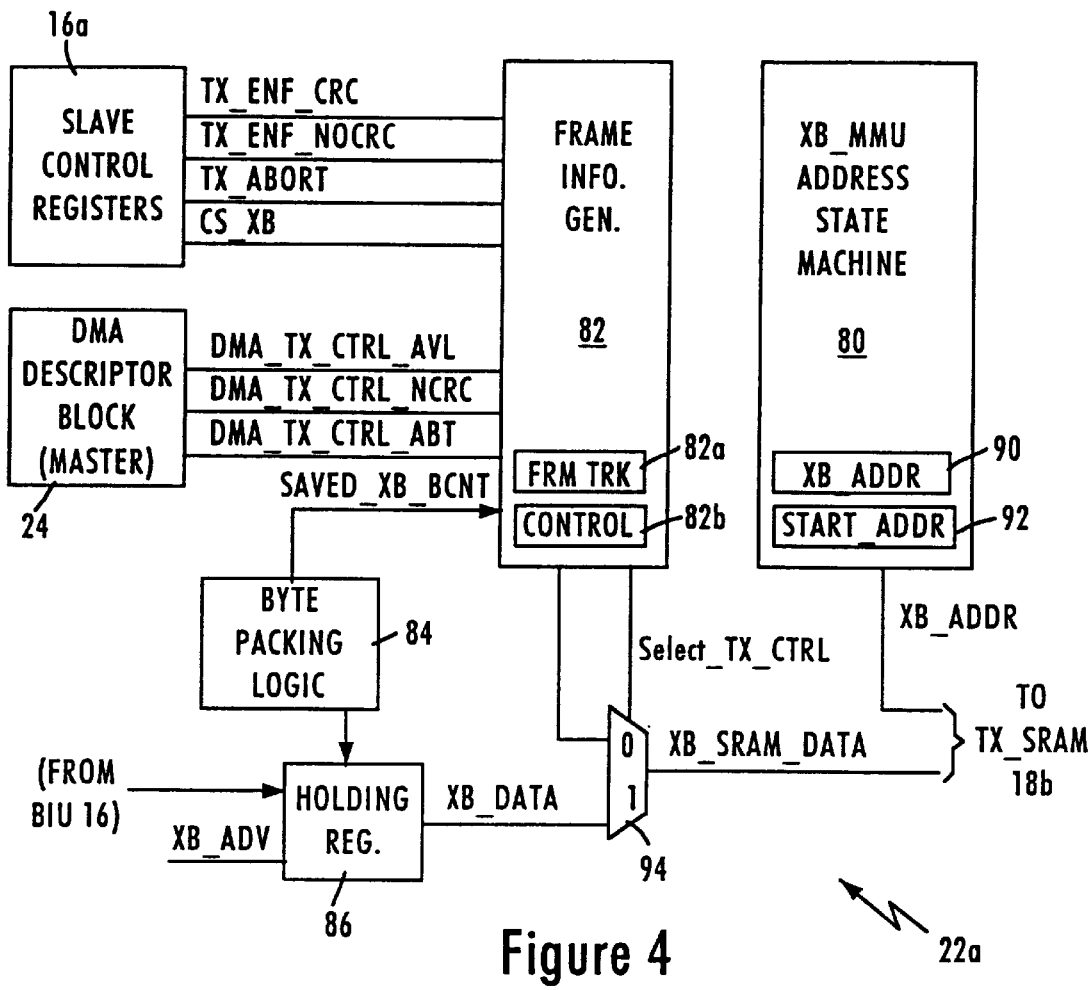
FIG. 4 is a block diagram illustrating the transmit bus memory management unit logic of FIG. 2 for generating and storing tracking information.

FIG. 4 is a block diagram illustrating the write controller 22*a* for generating frame track information and status information for a transmit data frame written to the transmit buffer (TX_SRAM) 18*b* according to an embodiment of the present invention. As shown in FIG. 4, the write controller 22*a* is configured for writing a data unit 64, having a data frame 68 and corresponding tracking information 66, into the random access memory 18*b*. As described below, the memory controller 22*a* is configured for generating the tracking information including the frame track 66 and the control field 70 based on transfer status signals from either the slave interface 16*a* or the descriptor management block 24. The write controller 22*a* includes an address state machine 80, frame information generation logic 82, and byte packing logic 85 for controlling a holding register 86. The byte packing logic 84 is configured for shifting a byte alignment of a data frame received from the BIU 16 prior to storage in the transmit buffer 18*b*. Specifically, PCI bus transfers may include invalid data bytes at the beginning of a bus transfer indicated by the control/byte enable signal on the PCI bus 12. The byte packing logic 84 performs byte alignment in the holding register 86 to ensure that the first valid data byte in a PCI bus transfer is stored as the first byte in the stored data unit 64 at location D0. The byte packing logic 84 also monitors the number of bytes that have been stored in the transmit SRAM 18*b* and outputs the byte count for the number of bytes stored in the TX_SRAM 18*b* for the current data frame (saved_XB_BCNT) to the frame information generation logic 82.

The frame information generation logic 82 generates the tracking information and the status information for storage in the control field 70 based on transfer status signals from the slave control registers 16*a* and the DMA descriptor block 24. Since the network interface device is configured to transfer data from the PCI bus 12 to the transmit SRAM 18*b* in either a master mode or a slave mode, the frame information generation logic receives both sets of transfer status signals to enable generation of the tracking information independent of the transfer protocol (i.e., DMA master mode or slave mode) between the network interface device 10 and the PCI bus 12.

As shown in FIG. 4, the slave control registers 16*a* output the following transfer status signals to the frame information (generation logic 82: TX_ENF_CRC, TX_ENF_NOCRC, and TX_ABORT. The signal TX_ENF_CRC indicates to the frame information generation logic 82 that the last byte of the frame to be transmitted has been loaded into the transmit SRAM 18*b*. The signal TX_ENF_NOCRC indicates to the frame information generation logic 82 that the last byte of the frame to be transmitted has been loaded into the TX_SRAM 18*b* with a CRC field already appended to the frame. Tile signal TX_ABORT is used to indicate to the frame information generation logic 82 that transmission of the frame that is currently being loaded into the TX_SRAM 18*b* is to be aborted in an orderly fashion. The frame information generation logic 82 also receives a slave chip select (CS_XB) from the BIU 16 to select the XB_MMU 22*a* for slave write access to the TX_SRAM 18*b*.

If master (DMA) mode is used, the DMA descriptor block 24 outputs the following transfer status signals to the frame information generation logic 82: DMA_TX_CTRL_AVL, DMA_TX_CTRL_NCRC, and DMA_TX CTRL_ABT. The transfer status signal DMA_TX_CTRL_AVL indicates that the supplied signals DMA_TX_CTRL_NCRC and DMA_TX_CTRL_ABT used to generate the control field 70, are valid. The transfer control signal DMA_TX_CTRL_NCRC is used to drive the input for the NOCRC field 76. The DMA_TX_CTRL_ABT input is used as an input for the abort bit 74 of the control field 70.

As described below, the frame information generation logic 82 generates the tracking information based on the transfer status signals from either the slave control register 16*a* or the master descriptor block 24, plus the determined byte count (XB_BCNT) from the byte packing logic 84. The frame information generation logic 82 also interacts with the address state machine 80 to obtain the end of frame address (ENF ADDR) for the frame track 66, and to control jumping to a different memory location to update the frame track field 66. Specifically, the address state machine 80 includes a write pointer 90 for storing an address value of the memory address location (XB_ADDR) to be accessed for writing data. The address state machine 80 also includes a start address register 92 for storing the memory location of the frame track field 66 for the currently-written data frame.

Figure 5:
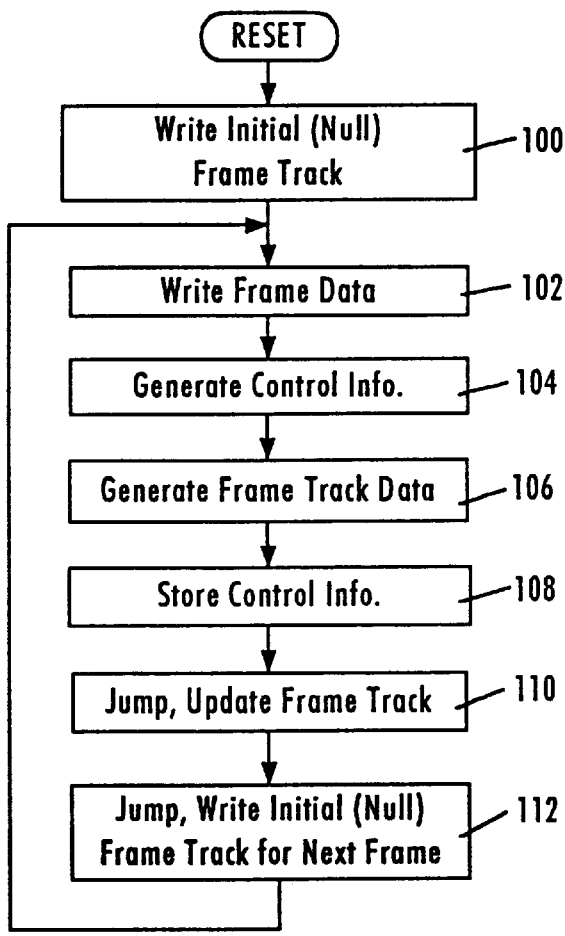
FIG. 5 is a flow diagram illustrating the method for storing the data frame and corresponding tracking information in a buffer memory according to an embodiment of the present invention.

FIG. 5 is a flow diagram 1 illustrating the method for storing data associated with the data frame in the transmit buffer (TX_SRAM) 18*b* according to an embodiment of the present invention. As shown in FIG. 5, the method begins in step 100 following a reset condition, where the address pointer 90 (XB_ADDR) is set to a predetermined initial memory location. The address state machine 80 stores the first buffer memory location in the start address register 92, and reserves a first buffer memory location for tracking information 66 corresponding to a first frame by writing null data in step 100 into the first buffer memory location. Hence, the first buffer memory location stores null data to ensure that the read-side controller (e.g, XM_MMU 22*b*) can identify the data unit 64 as having invalid (i.e., incomplete) data. The address state machine 80 then increments the write pointer 90, and the XB_MMU 22a then begins to wait for a transfer data frame from the host memory via the BIU 16.

The XB_MMU 22a then writes the frame data into the contiguous buffer memory locations following the first buffer memory location in step 102. As described above, the data frame may be transferred by either a master operation or slave operation. The frame information generation logic 82 then generates status and control information in step 104 in response to detection of an end of frame signal, and the frame track data for the frame track field 66 in step 106. The frame information generation logic 82 stores the status and control information in the control field 70 in step 108, and then jumps in step 110 to the first buffer memory location specified in the start address register 92 and writes the generated frame track data 66 into the first buffer memory location. As shown in FIG. 4 the frame information generation logic 82 outputs the generated frame track data to a selection circuit 94 that selectively outputs the byte-aligned frame data (XB_DATA) or the control information output by the frame information generation logic 82 in response to a select signal (select_TX_CTRL). Hence, the control data in the control field 70 and the frame track data in the first buffer memory location 66 are written in the TX_SRAM 18b using the same input data bus (XB_SRAM_DATA) based on manipulating the write pointer XB_ADDR 90 to jump to the appropriate memory location.

Following writing of the frame track field 66, the frame information generation logic 82 then causes the address state machine 80 to jump to the next location after the end of the data unit 64 in step 112, and write an initial frame track data for the next frame.

Hence, the XB_MMU initially writes null values into the frame track field 66 in order to advance the write pointer 90 to the next memory location to enable immediate writing of frame data 68 into the contiguous buffer memory locations. Hence, the arrangement of initially writing null frame track values in the frame track field 66 enables the XB_MMU to immediately write the initial frame data DWORD (e.g., D0) into the TX_SRAM 18b. Once the writing operation is complete for the frame data 68 and the control data 70, the XB_MMU 22a can then update the frame track field 66 with the appropriate data, and then jump to the next frame track field to write null data in anticipation of PCI bus transfer for the next data frame $64_2$.

Figure 6:
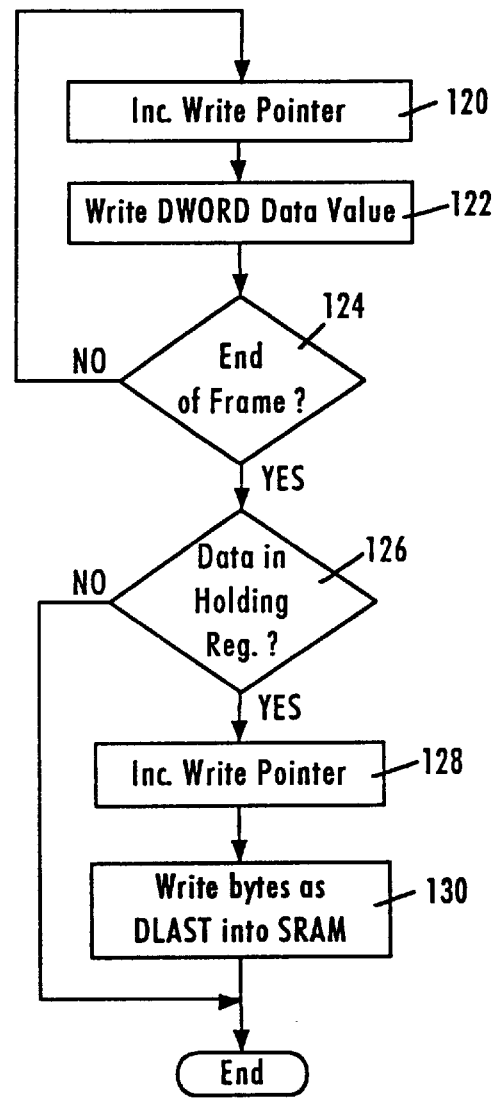
FIG. 6 is a flow diagram illustrating in detail the step in FIG. 5 of writing frame data into the random access memory.

FIG. 6 is a flow diagram illustrating in detail the step 102 of writing frame data into the contiguous buffer memory locations. As shown in FIG. 6, the address state machine 80 increments the write pointer 80 in step 120, and writes the appropriate DWORD data value in step 122. The frame information generation logic 82 then checks in step 124 whether an end of frame condition has been detected. Specifically, the frame information generation logic 82 detects an end of transmit frame by detecting either an end of frame command or a request for transmit abort. When the frame information generation logic 82 detects assertion of CS_XB indicating slave mode, the frame information generation logic 82 determines whether the TX_ABORT signal is asserted. If the abort signal is not asserted, the frame information generation logic 82 checks whether either the TX ENF CRC signal or the TX_ENF NOCRC signals are asserted, each indicating that the last byte of the frame to be transmitted has been loaded into the TX_SRAM 18b. Hence, if the frame information generation logic 82 detects the presence of either of the three above-identified transfer control signals from the slave control registers 16a in conjunction with the slave chip select (CS_XB), the frame information generation logic 82 deems detection of an end of frame.

In DMA mode, the frame information generation logic 82 determines the presence of the DMA_TX_CTRL_AVL signal, indicating the end of a transfer. If the frame information generation logic 82 determines the end of the frame in step 124 (in either DMA/master or slave mode), the frame information generation logic checks in steps 126 whether there is any remaining data bytes in the holding register 86 that have not yet been stored in the TX_SRAM 18b. Specifically, an end of frame signal may have been generated for purposes of the PCI bus transfer, although a remaining number of bytes may still be stored in the holding register 86. The frame information generation logic 82 checks the least two significant bits of the byte count (saved_XB_BCNT) to determine the number of stored bytes. If saved XB_BCNT [1:01] equals 0, then all the data has been written into the TX_SRAM 18b. However, if the saved_XB_BCNT [1:0] equals 1, 2, or 3, indicating 1, 2 or 3 bytes of data in the holding register 86, the frame information generation logic 82 increments the write pointer 90 in step 128, and writes the stored bytes in the holding register as the last of the contiguous buffer memory locations (DLAST) in step 130.

Figure 7:
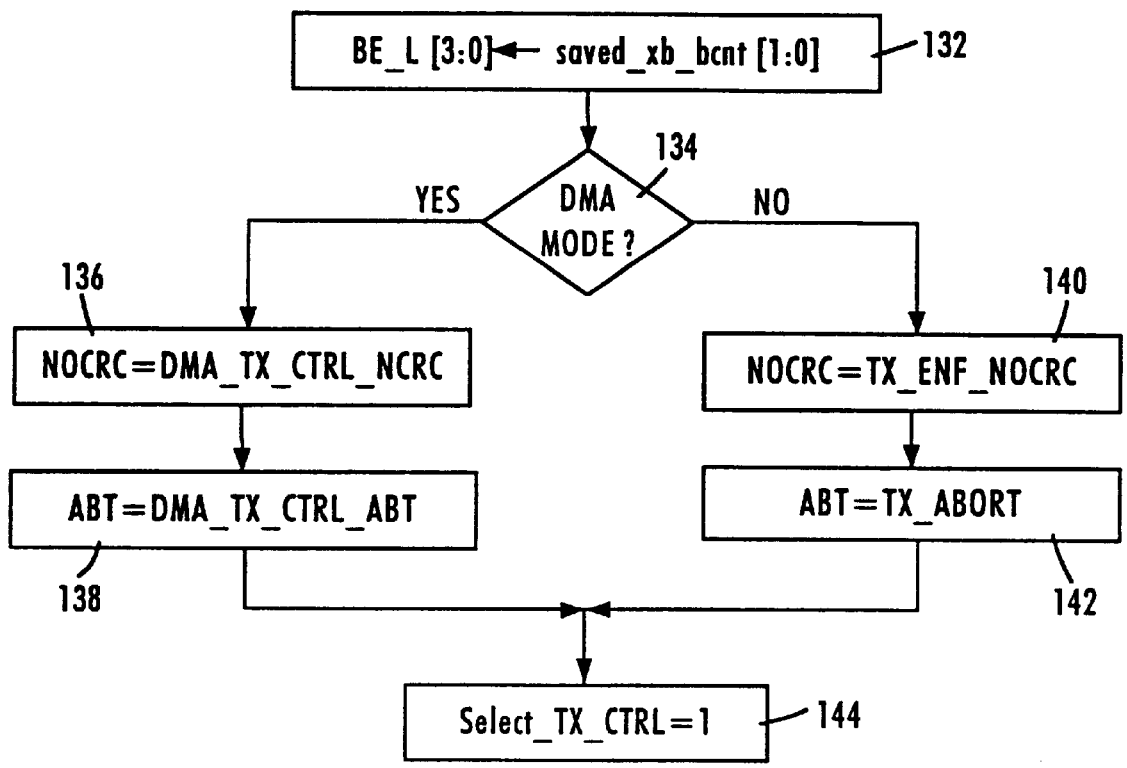
FIG. 7 is a flow diagram illustrating in detail the step of generating the control information of FIG. 5.

FIG. 7 is a flow diagram illustrating in detail the steps of generating the control information in step 104 of FIG. 5. As shown in FIG. 3A, the control field 70 includes the status information for byte enable (BE_L) indicating the number of valid data bytes in the last contiguous memory location for the frame data 68 (e.g., DLAST), the abort field 74, and the NOCRC field 76. The frame information generation logic 82 converts the two least significant bits of the saved_XB_BCNT identifying the number of valid bytes on the last contiguous buffer memory location into a four-bit field where each bit specifies a valid status of the corresponding byte in the DLAST memory location.

The frame information generation logic 82 then determines in step 134 whether DMA or slave mode is used, for example by assertion of either CS_XB indicating slave mode or assertion of DMA_TX_CTRL_AVL, indicating DMA (master) mode. If in step 134 the frame information generation logic 82 determines DMA mode is used, the frame information veneration logic 82 stores the NOCRC field 76 and the ABORT field 74 in steps 136 and 138 in a control register 82b based on the respective DMA control signals. The values generated for the byte enable field 72, the abort field 74, and the NOCRC field 76 in FIG. 7 are temporarily stored in a control register 82b prior to storage in the TX_SRAM 18b.

If in step 134 the frame information generation logic 82 determines slave mode is used, the NOCRC field 76 in the register 82b is set by the corresponding NOCRC bit from the slave control register 16a in step 140, and the ABORT field 74 is set in the register 82b based on the corresponding ABORT signal from the slave control register 16a in step 142 and the holding register 82b.

Once the control register 82b has been set with the appropriate control information from steps 132–142, the frame information generation logic 82 sets the select signal driving the selection circuit 94 in step 144, and increments the write pointer 90 in step 146 to enable storing of the control information from the holding register 82b to the control field 70 at the first contiguous memory location following the written data frame 68.

Figure 8:
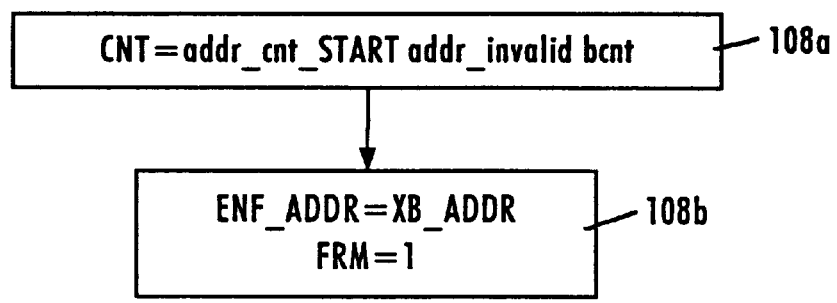
FIG. 8 is a flow diagram illustrating in detail the step of generating the frame track data in FIG. 5.

FIG. 8 is a flow diagram illustrating the steps for generating the frame track data in step 106. Specifically, the frame information veneration logic 82 determines the count value (CNT) by subtracting the value of the write pointer 90, minus the address value in the start address 92, minus the invalid byte count determined from the byte enable value (BE_L) in step 106a. Although step 106a assumes no wrap-around condition has occurred (e.g., the value of the start address in register 92 is less than the value of the write pointer 90), step 106a can also accommodate wrap-around conditions using modulo arithmetic relative to the size of the transmit buffer 18b. The count determined in step 106a is stored in the count (CNT) field in the frame track holding register 82a. The frame information generation logic 82 then stores the end of frame address (ENF ADDR) as the current write value for the write pointer 90 in step 106b, and sets the frame bit equal to 1 in the register 82a.

Once the frame track holding register 82a has been updated with the fields FRM, CNT, and ENF address, the frame information generation logic 82 jumps to the frame track location of the current frame, writes the frame track value from the holding register 82a to the frame track memory location 66 in the TX_SRAM 18b, and then jumps to the next location after the end of the frame in step 112 (see FIG. 5).

Hence, the disclosed embodiment enables generation and storage of frame track and control information contiguous with the stored data frame 68, enabling a single data unit 64 to include frame track field 66, the frame data 68 and control information 70. Hence, the read controller (XM_MMU) 22b can quickly determine the status of each stored data frame and the transmit SRAM 18b and make a decision whether to send the data to the MAC 20 or discard ("flush") the stored data frame based on the frame track information 66 and the control information 70. The disclosed arrangement also enable generation of frame track and control information using a single logic unit 82, independent of whether the data frame is transferred from the PCI bus 12 in a master mode, an I/O mapped slave mode, or a memory-mapped slave mode.

Figure 9:
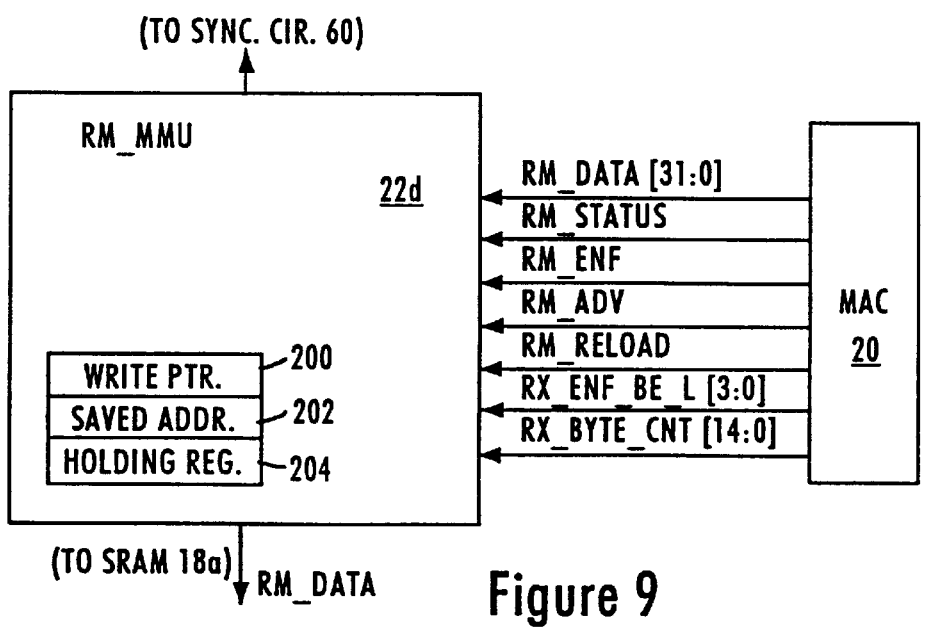
FIG. 9 is a block diagram illustrating in detail the receive MAC memory management unit of FIG. 2.

The disclosed arrangement can also be used for generating frame track and status information for a data frame received by the MAC 20 from the Ethernet (IEEE 802.3) network. FIG. 9 is a diagram illustrating the signals passed between the MAC 20 and RM_MMU 22d operating as the write controller for the RX_SRAM 18a. According to the disclosed embodiment, the MAC 20 generates the information associated with the frame track field 66' and status fields 70'. Specifically, the MAC 20 outputs data to the RM_MMU 22d via a 32-bit receive MAC data bus (RM_DATA). As described below, the MAC 20 outputs both frame data and the status data 70' on the RM_DATA bus. The MAC 20 also outputs an RM_STATUS signal indicating that the data on the RM_DATA bus is status information for the status field 70'. The MAC 20 also outputs a RM_ENF signal indicating end of the received frame. The MAC also outputs an RM_ADV signal used to advance a write pointer 200 in the RM_MMU 22d for the RX_SRAM 18a. The RM_RELOAD signal causes the RM_MMU 22d to reload the received SRAM write pointer with the save write pointer in register 202, and is used to discard frames that are smaller than 64 bytes.

The MAC 20 also outputs a byte count value (RX_BYTE_CNT), and a byte enable (RX_ENF_BE_L) that specifics the number of valid bytes in the last data DWORD stored in the DLAST memory location.

Figure 10:
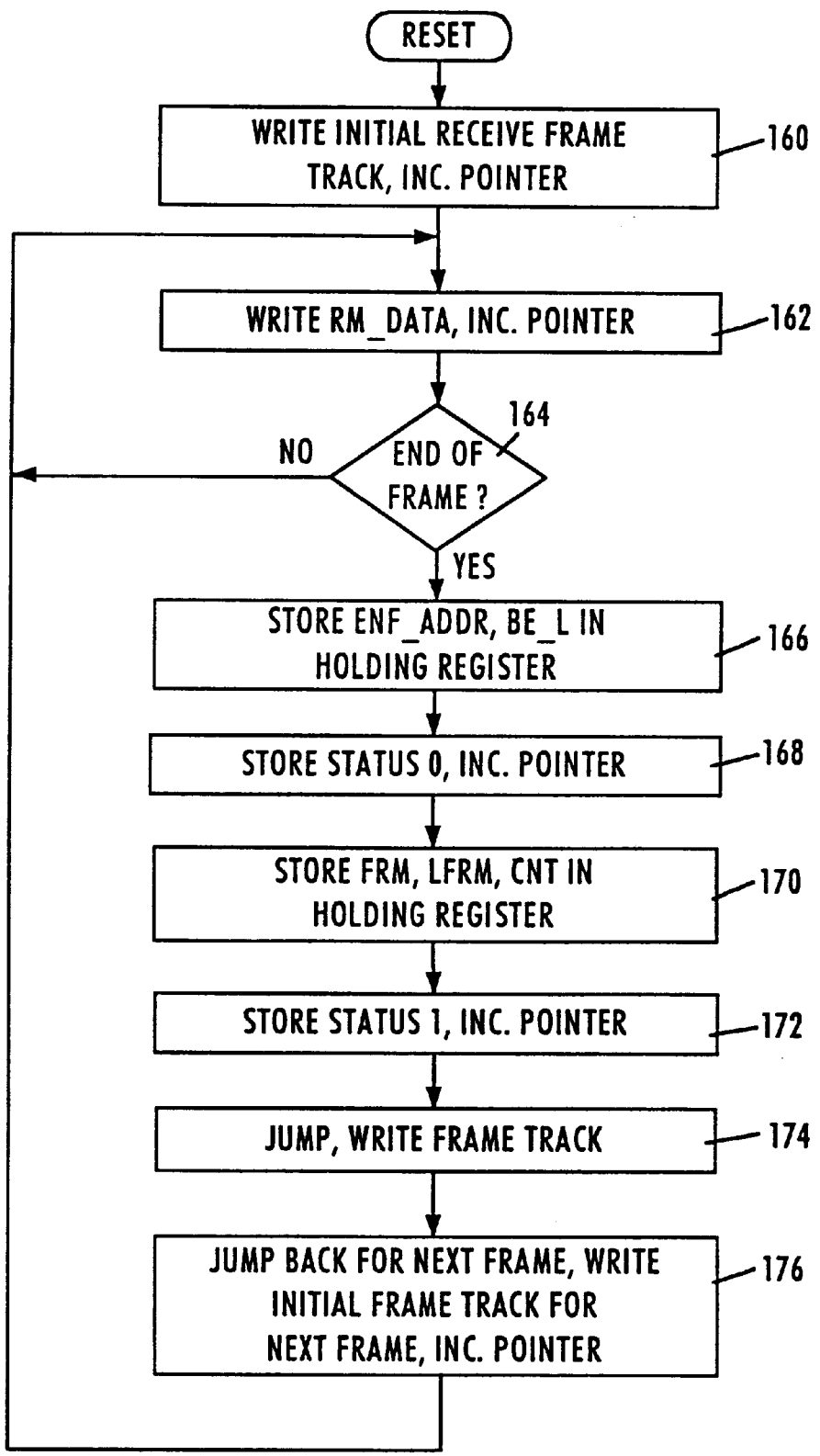
FIG. 10 is a flow diagram illustration the method for storing a data frame received from the media access controller of FIG. 2 and corresponding tracking information according to an embodiment of the present invention.

FIG. 10 is a flow diagram illustrating the method for writing the data unit 64' including the frame track field 66', the data frame 68 in contiguous buffer memory locations and the status fields 70'. The RM_MMU 22d begins after reset by writing an initial receive frame track value (e.g., null values) in the first buffer memory location of the RX_SRAM 18a, followed by incrementing the write pointer 200 in step 160. The RM_MMU 22d then waits for a data frame from the MAC 20, writes the received data frame into contiguous buffer memory locations (D0, D1, . . . ), and increments the pointer after the writing of each DWORD in step 162. The RM_MMU 22d then checks in step 164 whether and end of frame has been detected from the RM_ENF signal from the MAC 20. Assuming an end of frame condition is detected by the RM_MMU 22d, the RM_MMU 22d stores in step 166 the supplied end of frame address (ENF ADDR) from the write pointer 200, and the byte enable value (BE_L) supplied from the MAC 20 in the holding register 202. The RM_MMU 22d then stores the upper status field 70' from the RM_DATA bus in step 168, and then increments the write pointer 200. The RM_MMU then sets the frame bit in a holding register 202, and stores the 14-bit count value received from the MAC 20 in the holding register 202 in step 170. The write controller RM_MMU 22d then stores the lower status field 70' in step 172, and increments the write pointer 200. The RM_MMU 22d then jumps to the location of the frame track 66' in step 174 and writes the value from the holding register 202 into the RX_SRAM 18a. Following the updating of the frame track 66', the RM_MMU jumps back to the next contiguous memory location following the status fields 70', and writes the initial frame track for the next frame (step 176) in anticipation of receiving another data frame from the MAC 20.

According to the disclosed embodiment a network interface device includes a memory controller configured for storing tracking information and a corresponding data frame in a random access memory at contiguous memory locations, enabling the tracking information in the corresponding data frame to be accessed as a single data unit. Storing the tracking information, as well as status information, in combination with the data frame enables a read controller to efficiently determine the status of the stored data frame. Moreover, the write controller receiving transmit data from a host bus is configured to generate the tracking and/or status information for the corresponding data frame, independent of whether the data is transferred by a master transfer mode or a slave transfer mode. Hence, tracking and status information is stored in combination with a data frame in a data buffer, while minimizing the amount of redundant logic needed for generating the relevant tracking and status information.

Although the disclosed embodiment describes use of a PCI bus and an IEEE 802.3 network, it will be appreciated that other host bus systems and network protocols may be used for the network interface device 10.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network interface device for storing data associated with a data frame in a buffer memory, comprising:

reserving a first buffer memory location of the buffer memory for tracking information corresponding to the data frame;

writing the data frame in contiguous buffer memory locations following the first buffer memory location; and generating the tracking information for the data frame following the data frame writing step and writing the generated tracking information into the first buffer memory location.

2. The method of claim 1, further comprising:

generating status information specifying conditions of the written data frame following the data frame writing step; and storing the generated status information in a first contiguous memory location following the written data frame.

3. The method of claim 2, wherein the reserving step comprises writing null data into the first buffer memory location in response to a reset.

4. The method of claim 2, further comprising reserving a second contiguous memory location following the first contiguous memory location, for tracking information corresponding to a second data frame, independent of reception by the network interface device of the second data frame.

5. The method of claim 2, wherein the tracking information generating step comprises generating the tracking information independent of a transfer protocol between the network interface device and a host supplying the data frame via a host bus.

6. The method of claim 5, wherein the step of generating the tracking information independent of the transfer protocol comprises:

receiving transfer conditions, associated with the transfer of the data frame from the host from one of a master transfer control in the network interface device and slave transfer control; and generating the tracking information based on the received transfer conditions.

7. The method of claim 6, wherein the status information generating step comprises using at least a portion of the received transfer conditions as a portion of the generated status information.

8. The method of claim 1, wherein the tracking information generating step comprises generating the tracking information independent of a transfer protocol between the network interface device and a host supplying the data frame via a host bus.

9. The method of claim 8, wherein the step of generating the tracking information independent of the transfer protocol comprises:

receiving transfer conditions, associated with the transfer of the data frame from the host, from one of a master transfer control in the network interface device and slave transfer control; and generating the tracking information based on the received transfer conditions.

10. The method of claim 9, wherein the transfer conditions receiving step includes receiving a transmit abort indication from the one transfer control in response to a corresponding received signal indicating the transfer protocol used by the network interface device.

11. The method of claim 8, wherein the writing step comprises:

detecting an end of the data frame based on transfer conditions, associated with the transfer of the data frame from the host, output from the one transfer control;

detecting a presence of frame data in a holding register, configured for storing data prior to writing into the buffer memory, in response to the detected end of the data frame;

storing the detected frame data to the buffer memory at a last of the contiguous buffer memory locations; and identifying a number of valid bytes in the last contiguous buffer memory location based on the detected frame data in the holding register.

12. The method of claim 11, wherein the step of generating the tracking information based on the received transfer conditions comprises determining a number of bytes of the data frame stored in the buffer memory based on the contiguous buffer memory location following the first buffer memory location, the last of the contiguous buffer memory locations, and the identified number of valid bytes in the last contiguous buffer memory location.

13. The method of claim 12, wherein the step of generating the tracking information based on the received transfer conditions further comprises storing an address value of the last of the contiguous buffer memory locations and the determined number of bytes of the data frame in a holding register.

14. The method of claim 1, further comprising:

receiving an end of frame signal from a media access controller in the network interface device following reception of the data frame on a receive data path from the media access controller;

receiving status information on the receive data path following the receiving of the end of frame signal; and storing status information in a first contiguous memory location following the written data frame in response to the received end of frame signal.

15. The method of claim 14, wherein the generating step comprises:

storing in a holding register data frame information received from the media access controller;

jumping to the first buffer memory location following the status information storing step; and writing the tracking information from the holding register into the first buffer memory location.

16. The method of claim 15, further comprising reserving, a second contiguous memory location following the first contiguous memory location by:

jumping from the first buffer memory location to the second contiguous memory location following the tracking information writing step;

writing null data into the second contiguous memory location; and advancing a write pointer for a next data frame from the media access controller.

17. A network interface device for storing a data frame, comprising:

a bus interface unit configured for receiving a data frame from a host bus, the bus interface unit including a master interface for controlling reception of the data frame according to a master access protocol and a slave interface for receiving the data frame according to a slave access protocol;

a random access memory for storing the received data frame; and a memory controller configured for writing the received data frame and corresponding tracking information into the random access memory, the memory controller generating the tracking information based on transfer status signals corresponding to the reception of the data frame from one of the master interface and the slave interface wherein the memory controller writes the data frame into contiguous buffer memory locations following a first buffer memory location reserved by the memory controller for the tracking information, the memory controller writing the corresponding tracking information in the first memory location following writing of the data frame into the random access memory.

18. The network interface device of claim 17, wherein the memory controller comprises:

byte packing logic configured for shifting a byte alignment of bytes of the received data frame between the host bus and the random access memory, the byte packing logic determining a byte count for the number of bytes of the received data frame stored in the random access memory;

frame information generation logic configured for generating the tracking information based on the transfer status signals and the determined byte count;

an address state machine for selectively accessing the first memory location following writing of the data frame for writing of the tracking information.

19. The network interface device of claim 18, wherein the memory controller further comprises a selection circuit for selectively outputting one of bytes of the received data frame and the tracking information based on a selection signal output by the frame information generation logic.

\* \* \* \* \*